United States Patent [19]

Holko

[11] Patent Number: 5,021,107
[45] Date of Patent: Jun. 4, 1991

[54] PROCESS FOR JOINING OR COATING CARBON-CARBON COMPOSITE COMPONENTS

[76] Inventor: Kenneth H. Holko, 3620 Ticonderoga St., San Diego, Calif. 92117

[21] Appl. No.: 440,405

[22] Filed: Nov. 17, 1989

Related U.S. Application Data

[63] Continuation of Ser. No. 145,129, Jan. 19, 1988, abandoned.

[51] Int. Cl.$^5$ .............................................. B32B 31/06
[52] U.S. Cl. .................................. 156/89; 423/447.1; 423/447.2; 423/447.5
[58] Field of Search .......................... 156/89; 427/38; 228/120, 121, 193, 194, 208, 263.19, 263.21; 373/92; 423/445, 447.1, 447.2, 447.4, 447.5; 428/367, 368, 408, 902

[56] References Cited

U.S. PATENT DOCUMENTS

| | | | |
|---|---|---|---|
| 2,979,813 | 4/1961 | Steinberg | 373/92 |
| 3,946,932 | 3/1976 | Peterson | 228/121 |
| 3,956,548 | 5/1976 | Kovac et al. | 156/89 |
| 4,070,197 | 1/1978 | Coes | 156/89 |
| 4,419,161 | 12/1983 | Hailey | 156/89 |
| 4,432,821 | 2/1984 | Taylor et al. | 156/89 |
| 4,515,847 | 5/1985 | Taverna et al. | 423/447.2 |
| 4,526,649 | 7/1985 | Gupta et al. | 156/89 |
| 4,599,256 | 7/1986 | Vasilos | 428/408 |
| 4,645,115 | 2/1987 | Kamigaito et al. | 427/38 |
| 4,659,624 | 4/1987 | Yeager et al. | 423/447.2 |
| 4,696,829 | 9/1987 | Legg | 427/38 |
| 4,722,817 | 2/1988 | Nakano et al. | 423/447.5 |
| 4,762,269 | 8/1988 | Gyarmati et al. | 156/89 |
| 4,774,103 | 9/1988 | Kamigaito et al. | 427/38 |
| 4,775,548 | 10/1988 | Lankford | 427/38 |

FOREIGN PATENT DOCUMENTS

1153638  9/1983  Canada .............................. 156/89

OTHER PUBLICATIONS

Hammond & Slaughter, "Bonding Graphite to Metals with Transition Pieces" Welding Journal 1971.
Moore, "Feasibility Study of the Welding of S. C. The Journal of the American Ceramic Society", vol. 68, No. 6, Jun. 1985.

Primary Examiner—Caleb Weston
Attorney, Agent, or Firm—John R. Ross

[57] ABSTRACT

A process for joining or coating carbon-carbon composite components. For joining such components, surfaces of two components are prepared so that they match. An interlayer comprised of a material having a melting point in excess of 2500° F. is sandwiched between the two surfaces and the assembly is held together under compression while it is heated to a temperature sufficient to melt the interlayer material or to a temperature sufficient to cause interdiffussion between the interlayer and the carbon-carbon composite material. In a preferred embodiment of this invention the interlayer material is a carbide former. For example, if zirconium is chosen as the interlayer material, a joint can be prepared at a temperature of 3400° F. which will retain its strength to temperatures in excess of 4350° F. If the second surface is a removable backing, the interlayer provides a coating of the surface of the carbon-carbon composite component.

14 Claims, 2 Drawing Sheets

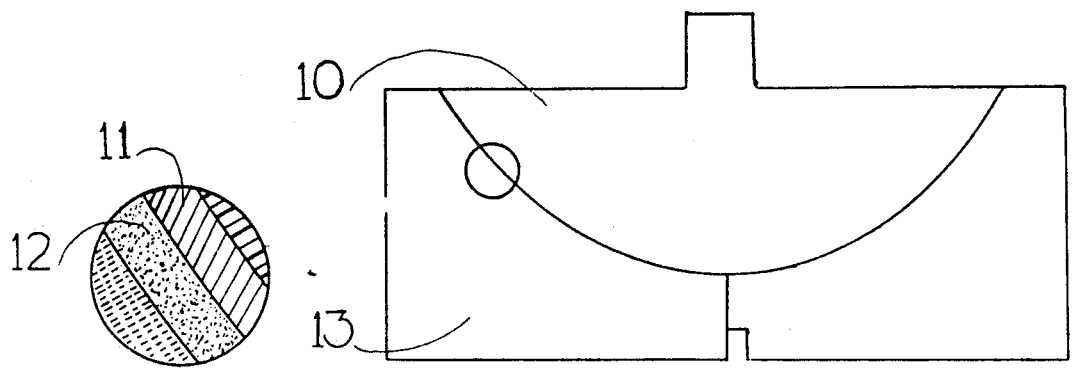
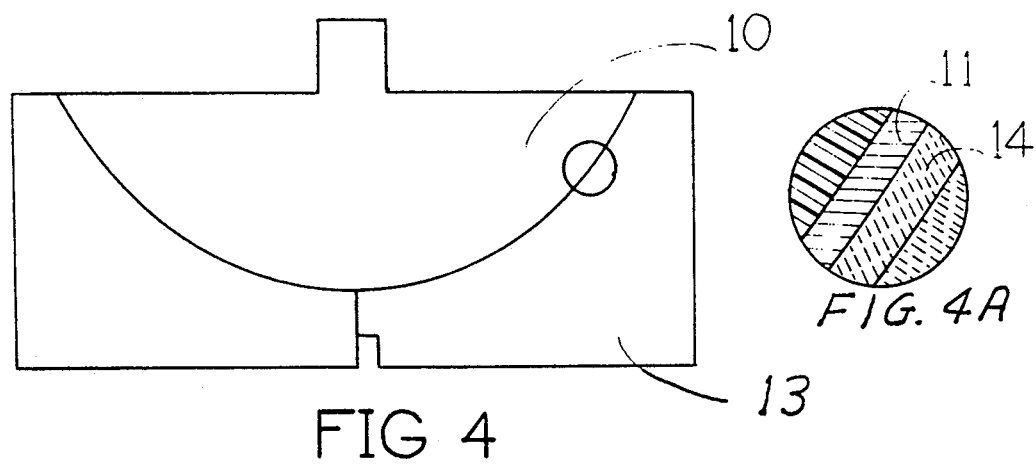
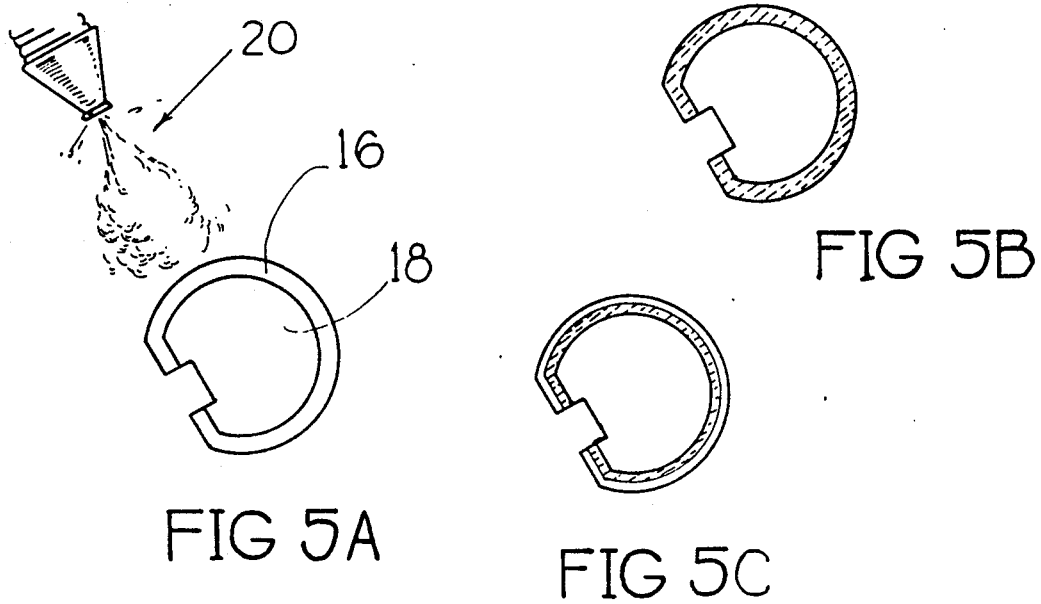

PROCESS FOR JOINING OR COATING CARBON-CARBON COMPOSITE COMPONENTS

This is a continuation of application Ser. No. 07/145,129, now abandoned, filed 1/19/88 Process for Joining or Coating Coating Carbon-Carbon Composite Components.

This invention relates to processes for joining or coating components and in particular high temperature carbon-carbon composite components.

BACKGROUND OF THE INVENTION

Carbon-carbon composite components are increasingly being proposed for use in very high temperature applications. The term carbon-carbon composite should be understood in this specification and the claims to refer to a composite comprised of fibers in a crystal graphitic form of carbon in a matrix which is also graphitic but in both crystal and amorphous forms of carbon. Carbon-carbon composites of this type are well known and are discussed is handbooks such as Engineer's Guide to Composite Materials and Engineered Materials Handbook. In many cases the need exists for joining carbon-carbon composite components for such use. Low temperature joints are made with epoxy materials and intermediate temperature joints are made with silver base braze alloys. Neither of these joining processes are suitable for structures designed to perform in the 2500 F. to 3000 F. temperature range.

Efforts to join high temperature components of other materials have been reported. Apparently, successful joints of silicon carbide were made by furnace brazing and diffusion welding using compounds such as molybdenum disilicide, titanium dicilicide and silicon hexaboride. Lower temperature graphite joints have been made using chromium carbide coatings and molybdenum coatings with copper interlayers.

SUMMARY OF THE INVENTION

The present invention provides a process for joining or coating carbon-carbon composite components. For joining such components, surfaces of two components are prepared so that they match. An interlayer comprised of a material having a melting point in excess of 2500 F. is sandwiched between the two surfaces and the assembly is held together under compression while it is heated to a temperature sufficient to melt the interlayer material or to a temperature sufficient to cause interdiffussion between the interlayer and the carbon-carbon composite material. In a preferred embodiment of this invention the interlayer material is a carbide former. For example, if zirconium is chosen as the interlayer material, a joint can be prepared at a temperature of 3400 F. which will retain its strength to temperatures in excess of 4350 F. If the second surface is a removable backing, the interlayer provides a coating of the surface of the carbon-carbon composite component.

BRIEF DESCRIPTION OF THE DRAWINGS

FIG. 1C is a section of an assembly with smooth surfaces.

FIGS. 3, and 4 are sketches each showing an assembly prepared for coating a carbon-carbon composite component using a backing.

FIG. 3A is a section of the assembly shown in FIG. 3.

FIG. 4A is a section of the assembly shown in FIG. 4.

FIGS. 5A, 5B and 5C are sketches showing steps of coating a component without the use of a backing.

DETAILED DESCRIPTION OF THE INVENTION

The present invention may be described by reference to the drawings.

Figure 1A:
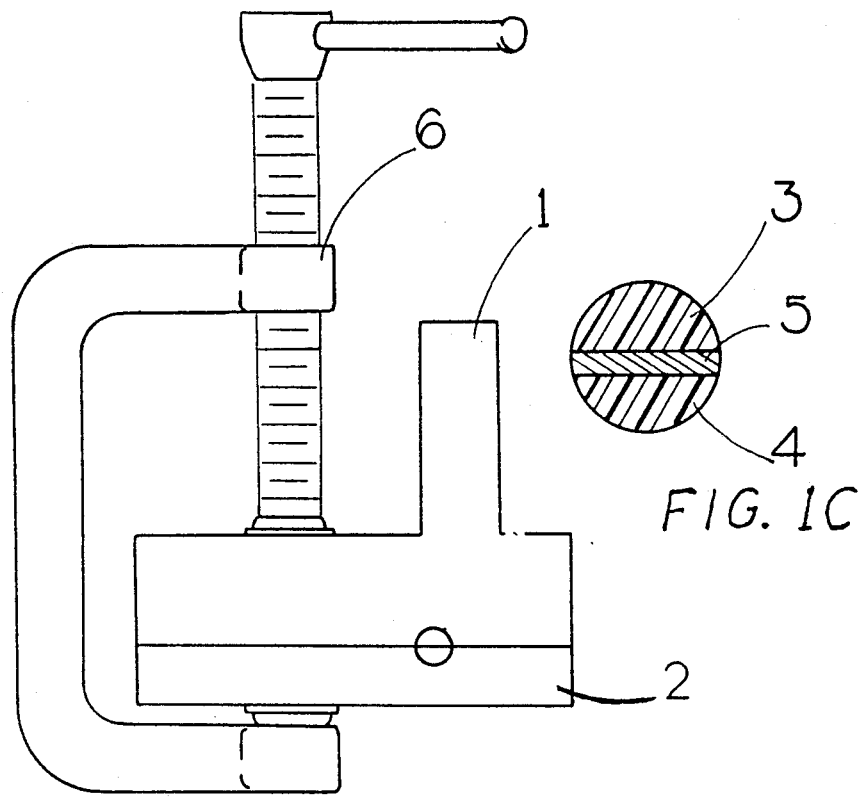
FIG. 1A is sketch showing an assembly prepared for joining two carbon-carbon composite components.
Figure 1B:
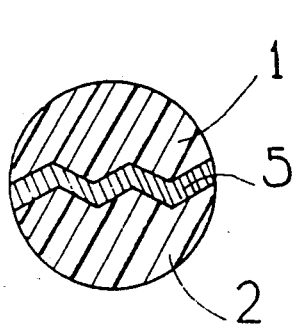
FIG. 1B is a section of an assembly with serrated surfaces.

Carbon-carbon composite components 1 and 2 are to be joined. The surfaces to be joined 3 and 4 are prepared so that they match. (The surfaces may be serrated to increase the joint area as shown in FIG. 1B.) The surfaces are cleaned and loose material is removed. A thin interlayer 5 is assembled between surfaces 3 and 4 as shown in FIG. 1C and the assembly is heated at a temperature at or above the melting point of the interlayer material or at a temperature sufficient to cause interdiffusion between the interlayer and the carbon-carbon composite. During the heating process the assembly is held together under compression by clamp 6. The heating is done in a vacuum, in an inert gas atmosphere or in an atmosphere which will produce or enhance the desired chemical reactions. The assembly is then cooled.

Figure 2:
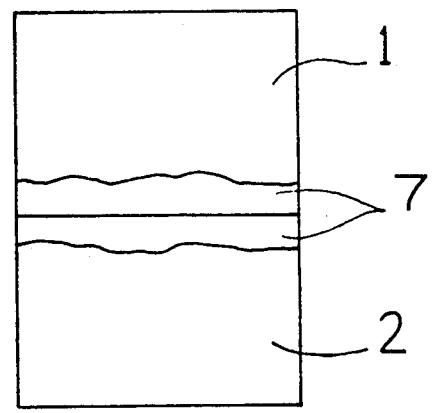
FIG. 2 is a sketch showing an enlargement of a section of the assembly shown in FIG. 1A.

An enlargement of a typical completed joint is shown in FIG. 2. As shown at 7, the interlayer material has diffused into the material of components 1 and 2 and the composite material has diffused into the interlayer material. Interdiffusion is generally limited to about 0.010 inch, but in cases where the interlayer has been forced to melt, the inventor has observed evidence of the flow of liquid metal up to 0.060 inch into the carbon-carbon material.

Interlayer materials are selected from reactive and refractory metals and compounds or other materials that will react during the joining process to produce refractory, high temperature compounds. The interlayers may be applied in the form of foils, compound powders, mixtures of elemental powders, or mixtures of compound and/or elemental powders. The interlayer materials may have inherently good strength at the intended use temperature or may develop this strength during reaction to form high strength compounds. An example of the latter material is Zr which reacts with C in the carbon-carbon composite to form ZrC which has good high temperature strength. An example of the former is MoSI (2) which has good initial high temperature strength and keeps it through the process.

In order to improve bonding, carbon-carbon surfaces may be modified by ion implantation or ion mixing. Ion implantation involves propelling ions toward the surfaces. The ions are embedded to a depth of up to several hundred angstroms into the carbon-carbon microstructure. Ion mixing involves first coating the surfaces by a process such as sputtering or chemical vapor deposition then bombarding the surface with high energy ions. Coating and component atoms are thus mixed together.

EXAMPLES

The composite material used was obtained from General Dynamics/Convair and is known as Kaiser K-Carb and consisted of WCA fabric (a rayon based fabric) and a Code 88A pitch/resin combination, fully graphitized. The material was ¼ inch thick and was cut into specimens of ⅜ by ⅜ inch. Surfacing was done with a milling cutter to a surface finish of about 8 rms. After machining, the specimens were washed and brushed in anhydrous ethyl alcohol. After washing and drying, all samples were vacuum furnace outgassed at 3600 F. for one hour at a vacuum of $1 \times 10^{-4}$ torr or better.

$Cr(3)C(2)$, $Cr(7)C(3)$, $B(4)C$, $HfB)2)$, $HfSi(2)$. Mixtures of $HfB(2)+TaB(2)$. Mixtures of $ZrB(2)+SiC$ $MoB+MoC$ $MoC+MoSi(2)$ $WSi(2)$.

TABLE 1

MATRIX OF EXPERIMENTS AND SUMMARY OF RESULTS

| Experiment Number | Interlayer Material | Surface Modification Treatment | Interlayer Thickness | Joining Process | Process Parameters | Other Variables |
|---|---|---|---|---|---|---|
| 1 | Titanium | None | .002"-2 foils | Vacuum Furnace Brazing | 3200° F./5 min. | Acetone clean foils |
| 2 | Titanium | None | .002"-2 foils | Vacuum Furnace Brazing | 3200° F./60 min. | Acetone clean foils |
| 3 | Titanium | None | .004"-4 foils | Vacuum Furnace Brazing | 3200° F./5 min. | Acetone clean foils |
| 4 | Titanium | None | .004"-4 foils | Vacuum Furnace Brazing | 3200° F./60 min. | Acetone clean foils |
| 5 | Titanium | None | .001"-1 foil | Vacuum Furnace Brazing | 3200° F./60 min. | Abraded foil, slow cooling after brazing |
| 6 | Titanium | None | .002"-2 foils | Vacuum Furnace Brazing | 3200° F./60 min. | Cleaned foils in HF/HNO$_3$ solution |
| 7 | Titanium | Ion Implantation w Ti | .002"-2 foils | Vacuum Furnace Brazing | 3200° F./60 min. | Cleaned foils in HF/HNO$_3$ solution |
| 8 | Titanium | Ion Mixing w Ti | .002"-2 foils | Vacuum Furnace Brazing | 3200° F./60 min. | Cleaned foils in HF/HNO$_3$ solution |
| 9 | Titanium | Ion Mixing w Ti | .002"-2 foils | Vacuum Furnace Brazing | 3500° F./60 min. | Cleaned foils in HF/HNO$_3$ solution |
| 10 | Zirconium | None | .0016"-2 foils | Vacuum Furnace Brazing | 3450° F./60 min. | Cleaned foils in HF/HNO$_3$ solution |
| 11 | Zirconium | Ion Implantation w Zr | .0016"-2 foils | Vacuum Furnace Brazing | 3450° F./60 min. | Cleaned foils in HF/HNO$_3$ solution |
| 12 | Zirconium | Ion mixing w Zr | .0016"-2 foils | Vacuum Furnace Brazing | 3450° F./60 min. | Cleaned foils in HF/HNO$_3$ solution |
| 13 | Molybdenum | None | .001"-1 foil | Diffusion Welding | 3500° F./60 min. | Cleaned foils in HF/HNO$_3$ solution |
| 14 | Molybdenum | Mo ion implantation | .001"-1 foil | Diffusion Welding | 3500° F./60 min. | Cleaned foils in HF/HNO$_3$ solution |
| 15 | Molybdenum | Mo ion mixing | .001"-1 foil | Diffusion Welding | 3500° F./60 min. | Cleaned foils in HF/HNO$_3$ solution |
| 16 | TiSi$_2$ | None | .003" | Vacuum Furnace Brazing | 3300° F./60 min. | Slurry brushed on |
| 17 | SiB$_6$ | None | .002" | Vacuum Furnace Brazing | 3550° F./60 min. | Slurry brushed on |
| 18 | SiB$_6$ | None | .002" | Vacuum Furnace Brazing | 3550° F./60 min. | Partial pressure argon |
| 19 | MoSi$_2$ | None | .003" | Vacuum Furnace Brazing | 3550° F./60 min. | Slurry/vacuum |

| Experiment Number | Metallographic results | Microhardness | Other Observations |
|---|---|---|---|
| 1 | Good bonded, some void formation, cracking in interlayer | — | |
| 2 | Good bonded, some void formation, cracking in interlayer | — | |
| 3 | Good bonded, some void formation, cracking in interlayer | — | Excess interlayer-surface coating |
| 4 | Good bonded, some void formation, cracking in interlayer | — | Excess interlayer-surface coating |
| 5 | Good bonded, some void formation, cracking in interlayer | >1284 DPH | Needs more inerlayer material |
| 6 | Good bonding, less void formation, some cracking in interlayer | >1284 DPH | Good quantity of interlayer |
| 7 | Good bonding, less void formation, some cracking in interlayer | >1284 DPH | Good quantity of interlayer |
| 8 | Good bonding, less void formation, some cracking in interlayer | >1284 DPH | Good quantity of interlayer |
| 9 | Good bonding, less void formation, some cracking in interlayer | >1284 DPH | Good quantity of interlayer |
| 10 | Good bonding, significant void formation some cracking | >1284 DPH | More interlayer needed |
| 11 | Good bonding, less void formation, some cracking | >1284 DPH | Less interlayer needed |
| 12 | Good bonding, less void formation, some cracking | >1284 DPH | Least additional interlayer needed |
| 13 | Good bonding, diffusion some formation | >1284 DPH | Dark phase formation |
| 14 | Some bonding, significant laying surface damage | >1284 DPH | Dark phase formation |
| 15 | Some bonding, good diffusion zone formation | >1284 DPH | Dark phase formation |
| 16 | Good bonding, lost considerable void formation in interlayer | >1284 DPH | Good crack filling/surface coating |
| 17 | Most of interlayer absent, some bonding to surfaces | Not taken | Poor crack filling |
| 18 | More interlayer present, good bonding to surface | Not taken | Some crack filling |
| 19 | Good bonding to surface and interlayer integrity | >1284 DPH | Good crack filling |

Interlayer material used along with the results of Examples 1 through 10 are listed in Table 1. In some cases as indicated in the table, surfaces were bombarded with ions. In some cases a sputter coating was applied prior to bombardment. The ion source was the MEVVA ion source at the Lawrence Berkeley Laboratory.

In addition to the interlayer materials listed in Table 1, the following materials and their carbides show potentially good high temperature strength: Si, B, Nb, W, Hf, Cr, V, Ta.

In addition, the following compounds show potentially good high temperature strength:

TiC, W(2)C, WC, ZrC, VC, V(2)C, TaC, Ta(2)C, SiC, NbC, Nb(2)C, MoC, Mo(2)C, HfC, Cr(3)C(6),

The elemental powders may also be selected from powders that react exothermically during heating to form a high temperature compound. An example would be the use of a stochiometric mixture of molybdenum and silicon powders, heated and reacted to form MoSi(2). The advantage is that a lower joining temperature can be used, i.e. a temperature below the melting temperature of the final compound.

SURFACE PROTECTION

The interlayer material and process described above turns out to be an excellent process for coating carbon-carbon composites for oxidation protection in high temperature applications. However, as shown in FIG. 3, the second carbon-carbon composite component 2 is replaced with a nonporous high temperature backing 13 such as zirconium oxide. As shown in FIG. 3A, the interlayer material 11 is prevented from adhering to the backing by a sacrificial zirconium oxide coating 12. The component is removed after the heating process leaving the carbon-carbon composite component coated with a high temperature protective coating.

As shown in FIG. 4 and FIG. 4A a refractory coating 14 is joined to the component. In this case the refractory coating might be a zirconium oxide sheet and the interlayer material zirconium.

The interlayer material can also be applied to a free surface without the use of a backing as shown in FIGS. 5A, B and C. The interlayer material 16 is applied to component 18 by any of a number of methods common to coating applications such as brushing or spraying 20 (as shown in FIG. 6A) on a slurry of powder and volatile carrier such as alcohol. Heating is done as previously described for joining. The coating is consolidated or melted and reacted with the carbon-carbon substrate to cause good adherence. The results can be total conversion to carbide as shown in FIG. 5B or partial conversion as shown in FIG. 5C.

The process can also be used to attach carbon-carbon composite components to structural members such as metallic structures. Furthermore, it could be applied to join other high temperature carbon based materials such as pyrolytic graphite.

The products of this process are particularly useful in aerospace applications where light very high temperature components are needed.

I claim:

1. A process for joining carbon-carbon composite component comprising the steps of:
   (a) preparing the surface of a first carbon-carbon composite component to be joined,
   (b) preparing a surface of a second carbon-carbon composite component so that the surface of said second component mates with said prepared surface of said first component,
   (c) preparing a thin interlayer having a thickness of between 0.001 inch and 0.004 inch and comprised of material having a melting point greater than 2500 F.,
   (d) assembling said first component, said interlayer and said second component so that said mating surfaces are facing each other with said interlayer sandwiched between, and
   (e) while holding said assembly together under compression, heating for a time said assembly at a temperature not exceeding 36650 F. but sufficient to cause substantial mixing of the atoms of the interlayer with the atoms of the carbon-carbon composite.

2. The process of claim 1, wherein the interlayer material is a carbide former.

3. The process of claim 1, wherein the interlayer material is chosen from a group consisting of Si, B, Nb, W, Hf, Cr, V, and Ta.

4. The process of claim 2, wherein the time of the heating step is sufficient to cause a substantial portion of said interlayer material to convert to a carbide.

5. The process of claim 4, wherein said time is sufficient to cause all or essentially all of said interlayer material to convert to carbide.

6. The process of claim 1, wherein the interlayer material is chosen from a group consisting of $MoSi(2)$, $TiSi(2)$, $SiB(6)$, $HfB(2)$, $HfSi(2)$, $TaB(2)$, $HfB(2)+TaB(2)$, $ZrB(2)+SiC$, $NoB+MoC$, $MoC+MoSi(2)$, $WSi(2)$, 7. The process of claim 6 wherein the time of the heating step is sufficient to cause a significant portion of said interlayer material to react chemically with material in said component.

8. The process of claim 1, wherein said temperature is at least equal to the melting point of said interlayer material.

9. The process of claim 1, wherein said temperature is less than the melting point of said interlayer material but high enough to permit substantial atomic mixing through interdiffusion.

10. The process of claim 9, wherein the heating time is sufficient to cause substantial atomic mixing.

11. The process of claim 1, wherein the surface of at least the first component is treated by the implantation prior to the heating step.

12. The process of claim 11, wherein the surface of at least the first component is coated with a non-carbon material prior to treatment by ion implantation.

13. The process of claim 12 wherein the coating is accomplished by sputtering or vapor deposition.

14. The process of claim 1 wherein the interlayer material is comprised of elemental powders which are stoichiometrically mixed and reacted during the heating process to acheive an exothermic reaction the product of which is a compound having a melting point in excess of the heating temperature.

* * * * *